Jan. 15, 1963    M. BROVERMAN ET AL    3,073,479
HERMETIC SEAL
Filed Oct. 7, 1960                                 2 Sheets-Sheet 1

Inventors,
Michael Broverman,
William F. Dripps,
by Francis K. Doyle
Their Attorney.

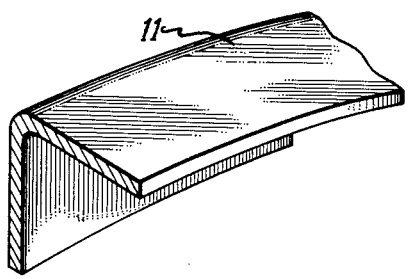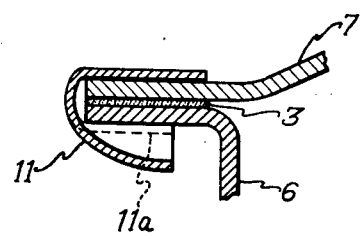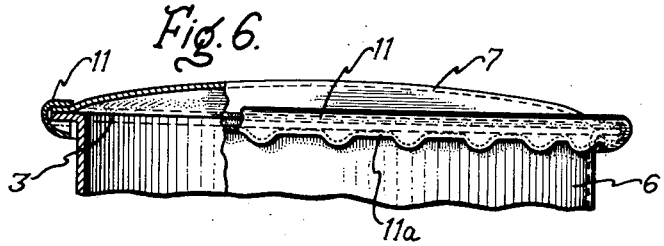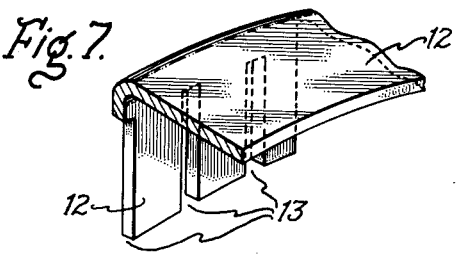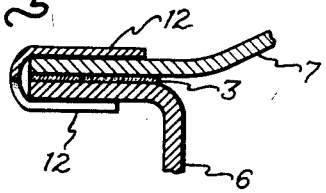

United States Patent Office 3,073,479
Patented Jan. 15, 1963

3,073,479
HERMETIC SEAL
Michael Broverman and William F. Dripps, Pittsfield, Mass., assignors to General Electric Company, a corporation of New York
Filed Oct. 7, 1960, Ser. No. 61,280
5 Claims. (Cl. 220—67)

This invention relates generally to a joint between the overlying surfaces of two members and more particularly to a hermetic seal for joining two overlying members.

Certain applications of industry require a gas-tight joint or hermetic seal between two members. If the members are metal; welding, soldering, or brazing are frequently resorted to. An alternative which is also often used is the provision of a gasket or a packing between the members, together with some arrangement for holding the members together. One example of these types of applications is a permanently sealed distribution transformer. The use of an insulating oil in the transformer casing which deteriorates when exposed to atmosphere requires that the casing be sealed hermetically. When this type of transformer is properly constructed, no maintenance is necessary for many years. In many cases, before the time for maintenance arrives, the transformer must be replaced by one of greater capacity, so that maintenance in the field is not ordinarily required. For the foregoing reasons, it is possible to make what is generally termed a "permanently" sealed transformer.

In the past, welding has been utilized for such a seal; however, a welding operation increases the cost of the transformers, and utilities, although preferring permanently sealed transformers, have therefore largely purchased gasket sealed transformers.

Recently developed adhesives such as epoxy resin cements can be utilized to make a suitable hermetic seal, but these have the detrimental characteristic of requiring a protracted curing period before their full strength is reached. This long curing period is not compatible with the mass production techniques used in the manufacture of distribution transformers. This period can be decreased by suitable heat treatment, but this solution is also not desirable in a production line type operation.

It is therefore an object of this invention to provide a hermetic seal which can be made by mass production techniques.

It is a further object of this invention to provide a hermetic seal suitable for use on distribution transformers.

Briefly stated, in carrying out the invention in one form, the members having surfaces to be sealed are arranged so that the surfaces are in an overlying relationship. A suitable adhesive is applied in the interface of the inner surfaces of the two members. A biasing means is then placed over the joint, biasing the members together and retaining them in sealed relation until the adhesive has cured.

In some instances it may be desirable to place a second layer of adhesive on the outer surface of one of the members which is to be sealed. This second layer of adhesive will act to hold the biasing means securely in position, especially during the curing of the first layer of adhesive.

The invention will be better understood from the following description taken in connection with the accompanying drawings; in which:

FIGURE 4 is a perspective view of a section of a hoop utilized in a second embodiment of the invention;

FIGURE 5 is a cross-section of the seal in the second embodiment of the invention;

FIGURE 6 is a fragmentary elevation view, partially in section of a container having a cover sealed thereon in accordance with the second embodiment of the invention;

FIGURE 7 is a perspective view of a section of a hoop utilized in a third embodiment of the invention; and FIGURE 8 is a cross-section of the seal in the third embodiment of the invention.

Figure 1:
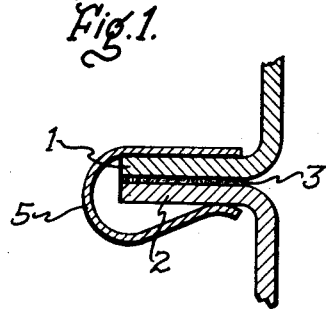
FIGURE 1 is a cross-section of a seal according to one form of the invention.

Referring now to FIGURE 1 of the drawings, two members 1 and 2 are shown having their surfaces arranged in an overlying arrangement. In accordance with the invention, in the interface between the inner surfaces of the two members, a first layer of adhesive 3 is located. A biasing means, shown as a generally U-shaped spring clip 5, is placed in overlying relation to the outer surfaces of the members 1 and 2, and this clip biases the two members 1 and 2 together. It is evident that due to the clamping effect of the spring clip 5, the two members 1 and 2 will be held together even though the layer of adhesive 3 is not cured.

Figure 1A:
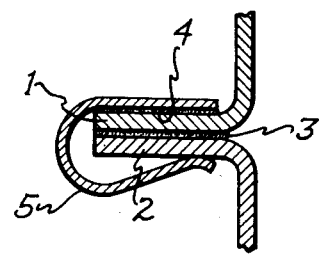
FIGURE 1a is a cross-section of a seal according to one form of the invention, similar to FIGURE 1, but showing the use of a second layer of adhesive.

Considering now FIGURE 1a of the drawing, the same type of seal is shown as in FIGURE 1. However, in this view a second layer of adhesive 4 is shown, applied to the outer surface of one of the members, in this instance, the member 1. The biasing means 5, in addition to being held firmly about the members 1 and 2 due to its resiliency, is further secured in place by the second layer of adhesive 4. This second layer of adhesive may be especially useful where further work must be done on the members 1 and 2 while the first layer of adhesive 3 is being cured. Of course, it will be understood that the second layer 4 of adhesive may be the same adhesive as used for layer 3 or it may be a different adhesive, such as a quick drying, non-permanent adhesive.

Figure 3:
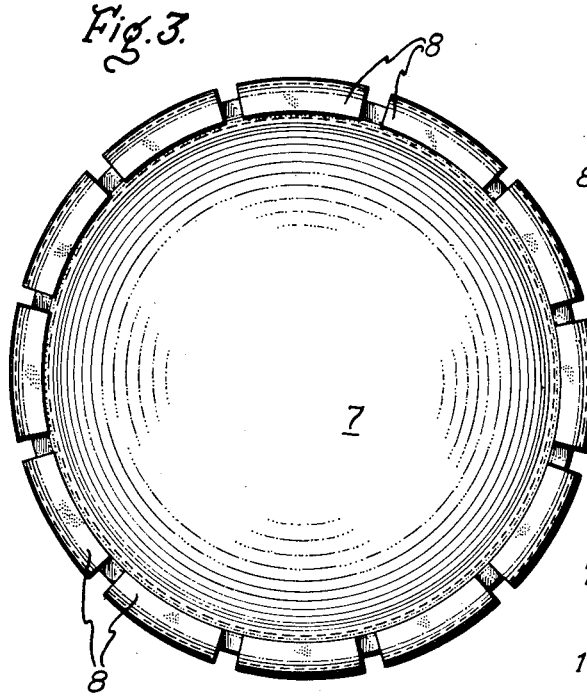
FIGURE 3 is a plan view of the embodiment shown in FIGURE 2.
Figure 2:
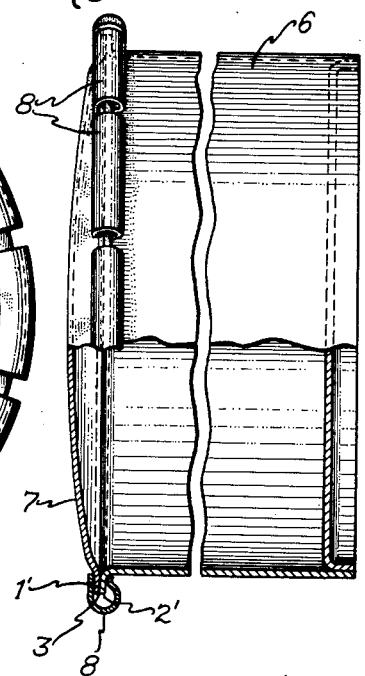
FIGURE 2 is a broken elevation view, partially in section of a container having a cover sealed thereon in accordance with a first embodiment of the invention.

Referring next to FIGURES 2 and 3, the invention is shown in a first embodiment as applied to a cylindrical container 6 to which a cover 7 is hermetically sealed. The container 6 and cover 7 are provided with overlying annular portions 1' and 2' respectively. A plurality of similar spring clips 8 are utilized which are arcuate in design as seen in a plan view such as in FIG. 3. Obviously, straight clips could be utilized if they were short; however, arcuate clips are better suited for a circular seal. These spring clips 8 are distributed about the periphery of the joint so as to provide a gas-tight seal around the entire joint. In this embodiment a layer of adhesive 3 is applied to the interface between the annular portions 1' and 2' of the cover 7 and the container 6, respectively in the same manner as shown in FIGURE 1. If desired, a second layer of adhesive may be applied to the outer surface of 1' or 2', to aid in holding the clips 8 in the same manner as discussed with reference to FIGURE 1a.

Referring next to FIGURES 4, 5, and 6, a second embodiment of the hermetic seal is shown. In FIGURE 4, a perspective view of a section of a hoop 11 of generally L-shaped cross-section is shown prior to its being used in sealing the cover 7 to the container 6. The hoop is given a peripheral configuration which will make it conform to the geometry of the seal to be made; in the example shown, for instance, the seal is circular and the hoop 11 is therefore also made circular. A crimping action is performed at intervals along the periphery of the hoop 11 so as to bias the cover 7 to the container 6 at a plurality of points, such as 11a, shown in FIGURE 6. Because of the initial shape of the hoop 11, it is not possible for the downwardly extending leg of the L-shaped hoop to be brought smoothly against the outer surface of the container at all points, so that biasing due to the crimping occurs at intervals. In a manner similar to that described for the first embodiment, a layer of adhesive 3 is applied between the overlying surfaces of container 6 and cover 7 as shown in FIGURE 5.

As an alternative to the second embodiment of the invention just described, in the third embodiment a hoop 12 as shown in FIGURE 7 may be utilized. This hoop 12 is constructed in an L-shaped cross-section with the downwardly extending leg of the hoop having a plurality of slots 13 cut up from the bottom edge of the leg. As can be seen in FIGURE 8 of the drawings, this hoop 12 with its top portion overlying the outer surface of the cover member 7 can have its downwardly extending leg brought smoothly into contact with the outer surface of the container member 6 throughout the periphery of the seal. Of course, a layer of adhesive 3 is applied between the overlying surfaces of container 6 and cover 7 as shown in FIGURE 8.

It is evident that in making seals in accordance with the invention, no delay is needed to allow the cement to cure. The seal can be formed and the container moved on for further processing immediately. By using an epoxy resin cement which will cure at room temperature, or a similar type of cement which will form a permanent seal between the surfaces, natural curing at ambient temperatures will occur without the need for any heat treatment.

In addition to these features, the possibility of a lineman opening the casing of a transformer in the field is eliminated since the joint must be destroyed in order to open the tank.

While particular embodiments of hermetic seals employing this invention have been shown and described, it will be obvious that changes or modifications may be made without departing from the invention. The concluding claims are intended to cover all such changes and modifications as fall within the true scope and spirit of the invention.

What is claimed as new and desired to secure by Letters Patent of the United States is:

1. A hermetic seal for joining a cover to a cylindrical container in which said cover and said container have overlying annular portions comprising a first layer of adhesive in the interface between the inner surfaces of said annular portions, and biasing means pressing said annular portions together, said means having one portion in contact with the outer surface of one of said annular portions and a second portion in contact with the outer surface of the other of said annular portions.

2. A hermetic seal for joining a cover to a cylindrical container as claimed in claim 1 wherein said biasing means comprises a plurality of clips of U-shaped cross-section.

3. A hermetic seal for joining a cover to a cylindrical container as claimed in claim 2 wherein a second layer of adhesive is applied to the outer surface of said one of said annular portions and one portion of each of said plurality of U-shaped clips is in contact with said second layer of adhesive.

4. A hermetic seal for joining a cover to a cylindrical container as claimed in claim 1 wherein said biasing means comprises a hoop of originally L-shaped cross-section in which one leg of said hoop is in contact with the outer surface of one of said annular portions and the other leg of said hoop is crimped against the outer surface of the other of said annular portions at a plurality of points.

5. A hermetic seal for joining a cover to a cylindrical container as claimed in claim 4 wherein said other leg of said hoop is slotted at intervals, whereby the crimped portions of said other leg lie generally smoothly on said other of said annular portions.

References Cited in the file of this patent
UNITED STATES PATENTS

| | | |
|---|---|---|
| 2,704,688 | Adell | Mar. 22, 1955 |
| 2,743,128 | Hawkswell et al. | Apr. 24, 1956 |
| 2,786,423 | Coffey | Mar. 26, 1957 |
| 2,967,161 | Hart | Jan. 3, 1961 |
| 3,012,689 | Harris | Dec. 12, 1961 |